United States Patent
Krajca et al.

(10) Patent No.: US 10,328,530 B2
(45) Date of Patent: Jun. 25, 2019

(54) FLEXIBLE AND LOCAL LASER SHROUD

(71) Applicant: The Boeing Company, Chicago, IL (US)

(72) Inventors: Scott E. Krajca, Seattle, WA (US); Cooper A. Wessells, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 459 days.

(21) Appl. No.: 15/277,917

(22) Filed: Sep. 27, 2016

(65) Prior Publication Data

US 2018/0085860 A1    Mar. 29, 2018

(51) Int. Cl.
| | |
|---|---|
| B23K 26/70 | (2014.01) |
| B23K 26/142 | (2014.01) |
| B23K 37/00 | (2006.01) |
| B25J 19/00 | (2006.01) |
| B25J 11/00 | (2006.01) |
| B23K 26/08 | (2014.01) |

(52) U.S. Cl.
CPC ........ *B23K 26/706* (2015.10); *B23K 26/0884* (2013.01); *B23K 26/142* (2015.10); *B23K 37/006* (2013.01); *B25J 19/0075* (2013.01)

(58) Field of Classification Search
CPC ........ B23K 26/70; B23K 26/14; B23K 37/00; B25J 11/00; B25J 19/00
USPC .......................................... 219/121.6–121.86
See application file for complete search history.

(56) References Cited

U.S. PATENT DOCUMENTS

| | | | |
|---|---|---|---|
| 4,575,610 A | 3/1986 | Gavin | |
| 5,124,524 A | 6/1992 | Schuster et al. | |
| 5,219,650 A | 6/1993 | Ritter | |
| 5,519,486 A * | 5/1996 | Baird | G01B 9/021 |
| | | | 356/35.5 |
| 5,780,806 A | 7/1998 | Ferguson et al. | |
| 5,938,954 A * | 8/1999 | Onuma | B23K 26/1224 |
| | | | 219/121.6 |
| 5,992,417 A | 11/1999 | Toepel | |
| 6,262,388 B1 | 7/2001 | Canella et al. | |
| 6,472,295 B1 | 10/2002 | Morris et al. | |
| 6,580,053 B1 * | 6/2003 | Voutsas | B23K 26/1435 |
| | | | 219/121.66 |
| 6,683,277 B1 | 1/2004 | Millard et al. | |
| 8,829,889 B2 | 9/2014 | Hannweber et al. | |
| 2007/0199930 A1 * | 8/2007 | McElroy | B23K 26/032 |
| | | | 219/121.86 |
| 2007/0258502 A1 | 11/2007 | Harrison et al. | |
| 2017/0341769 A1 * | 11/2017 | Haberbusch | F17C 5/007 |

* cited by examiner

*Primary Examiner* — Samuel M Heinrich
(74) *Attorney, Agent, or Firm* — Haynes and Boone, LLP

(57) ABSTRACT

Systems and methods according to one or more embodiments are provided for a flexible and local laser shroud that conforms to a contoured work surface and confines laser light energy from a laser end effector to the work surface. In one example, a system includes a laser end effector coupled to a robotic arm to provide laser light energy to a work surface. The system also includes a shroud coupled to the end of the robotic arm and extending to the work surface. The system further includes, as part of the shroud, a flexible laser light seal to conform to the work surface to substantially prevent the laser light energy from passing between the shroud and the work surface as the laser end effector travels along the work surface.

20 Claims, 10 Drawing Sheets

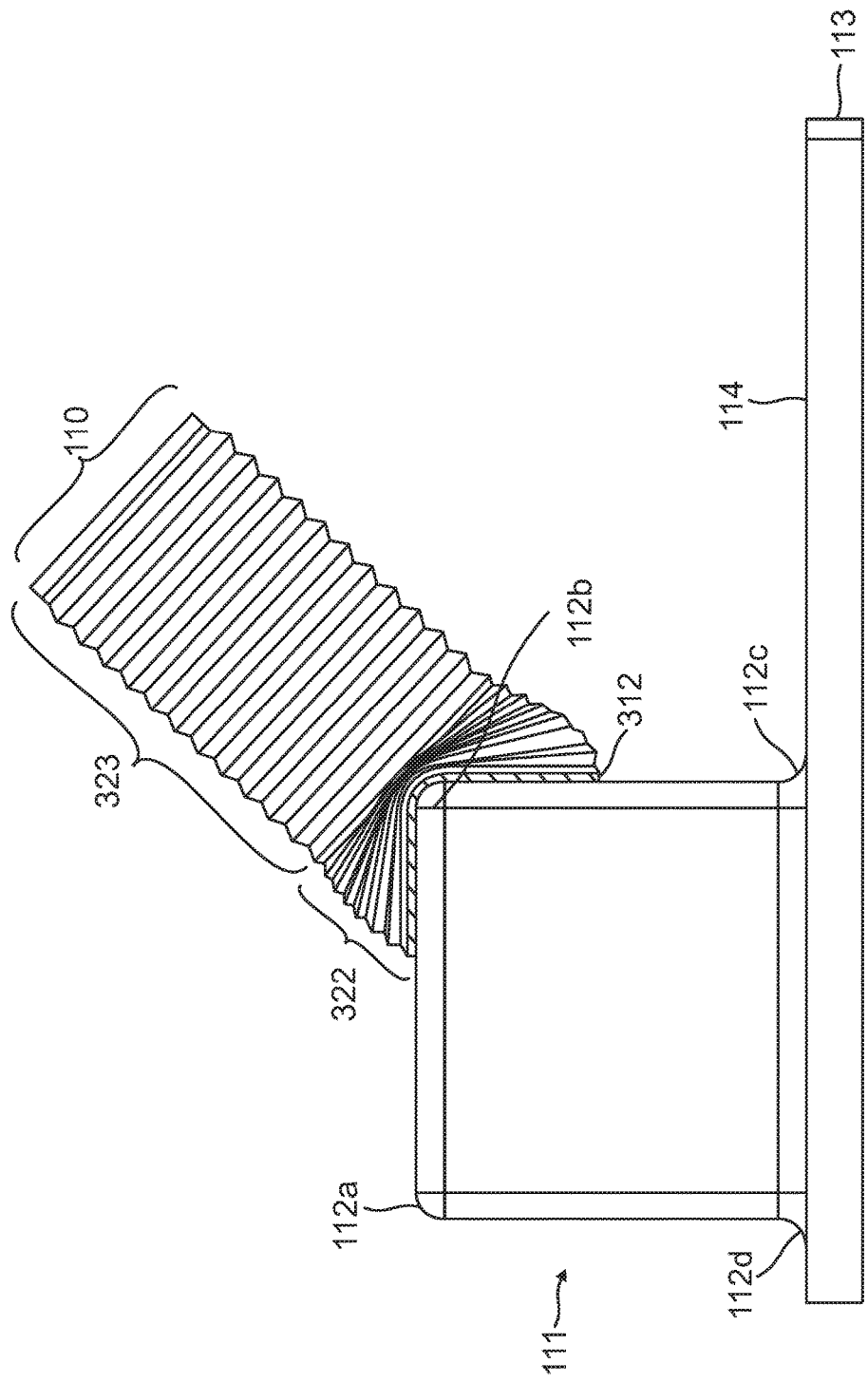

US 10,328,530 B2

FLEXIBLE AND LOCAL LASER SHROUD

TECHNICAL FIELD

The present invention relates generally to laser safety systems and, more particularly, to laser protective shielding.

BACKGROUND

In the field of laser systems there is an ongoing effort to provide for an improved approach to laser protective shielding. Lasers are used in a variety of commercial applications such as research and manufacturing, and are readily available. For example, in the field of manufacturing, automated robots or gantry systems may incorporate lasers for cleaning layup mandrels used in composite manufacturing to reduce time. However, lasers are capable of producing energy output that is potentially harmful.

Conventional techniques to provide for safe operation of lasers include isolating laser operations to special laser shielding rooms. Laser shielding rooms may provide for protection from laser energy reflected or scattered off a target. However, special laser rooms are expensive and time consuming to install and operate. For example, many specialty laser rooms may require complex systems such as door interlocks and separate ventilation systems. Furthermore, laser rooms may be impractical for laser operations where the target cannot be moved to the specialty laser room.

Another conventional technique is to use laser absorbing curtains combined with other laser protective equipment. However, laser curtains and protective eyewear may not be sufficient laser safety precautions at some locations.

SUMMARY

Systems and methods are disclosed herein in accordance with one or more embodiments that provide an improved approach to laser light protective shielding. A flexible and local laser shroud provides for a portable and flexible laser safety device to protect from the harmful effects of laser light energy emissions during laser operations where a laser end effector is coupled to a robotic arm to perform laser ablation of a tool, for example. In some embodiments, the flexible laser shroud is coupled to the robotic arm to prevent laser light energy from passing through the shroud and between the shroud and the work surface as the laser end effector travels along the tool. In one example, the flexible laser shroud includes a bellows rigidly coupled to the robotic arm and a flexible laser light seal flexibly coupled to an end of the bellows to conform to a contoured work surface. The flexible laser shroud conforms to the work surface to prevent laser light energy from passing through the shroud and between the shroud and the work surface as the robotic arm moves the laser end effector over the work surface.

In one embodiment, a system includes a laser end effector coupled to a robotic arm and configured to provide laser light energy to a work surface; and a shroud coupled to an end of the robotic arm and extending to the work surface, wherein the shroud comprises a flexible laser light seal configured to conform to the work surface to substantially prevent the laser light energy from passing between the shroud and the work surface as the laser end effector travels along the work surface.

In another embodiment, a method includes turning on a laser end effector coupled to a robotic arm; lasing a work surface by the laser end effector; moving the laser end effector along the work surface by the robotic arm; and confining laser light energy from the laser end effector to the work surface with a shroud coupled to the robotic arm.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 6A-C illustrate a flexible laser shroud on a contoured surface in accordance with embodiments of the disclosure.

DETAILED DESCRIPTION

Figure 1:
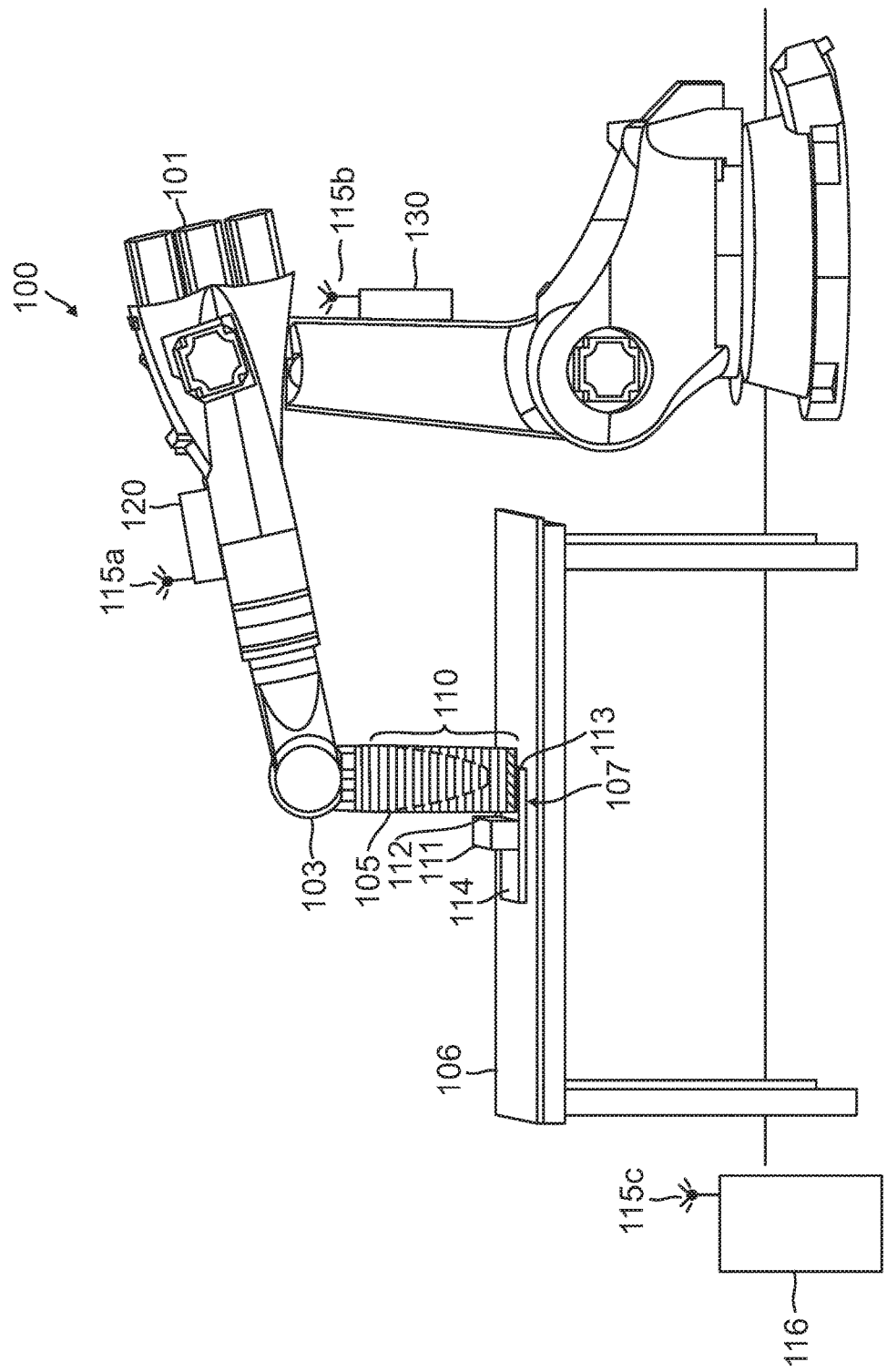
FIG. 1 illustrates a flexible laser shroud system secured to a robot in accordance with an embodiment of the disclosure.

Various implementations of a flexible laser shroud system are provided to safely operate a laser system and provide laser safety protection. The flexible laser shroud may be implemented to provide laser safety protection for laser operations to, for example, clean waste material from a composite layup tool. Laser operations may be performed by a laser end effector attached to a robotic arm. The flexible laser shroud may be attached to the robotic arm on a first end and conform to a work surface of the tool on a second end to prevent laser light energy from passing through the shroud and between the shroud and the work surface as the laser end effector travels along the work surface.

The flexible laser shroud may include a bellows and a flexible laser light seal. The bellows may include folds where a first portion of the folds are coupled to bendable support rings for bendable support. The flexible laser light seal may be flexibly attached to the first portion of the bellows and extend to the work surface. The flexible laser light seal conforms to the work surface. A second portion of the folds may be coupled to rigid support rings. The second portion of the bellows may be attached to the robotic arm. In this regard, as the laser end effector moves along the work surface of the tool, the flexible laser shroud provides a rigid support at the end coupled to the robotic arm and conforms to the work surface of the tool on the end coupled to the flexible laser light seal.

In some embodiments, the flexible laser light seal is implemented as segmented angled brushes, where the segmented angled brushes prevent laser light energy from passing through the shroud and between the shroud and the work surface. In various embodiments, two or more rows of segmented angled brushes are included as flexible laser light seals. The rows of angled brushes are angled in opposite directions to prevent reflected and/or scattered laser light energy from passing through the shroud and between the shroud and the work surface as the laser end effector travels along a contoured work surface. In some embodiments, an opaque laser absorbing material is included between adjacent rows of angled brushes for additional blocking of laser light energy.

In some embodiments, the flexible laser shroud system includes an ambient light detector to detect ambient light within the shroud. If ambient light is detected, the ambient light detector transmits an electrical signal to laser failsafe electronics to stop projecting laser light energy at the laser end effector. In some embodiments, laser failsafe electronics includes an interlock to prevent the laser end effector from receiving laser light energy after receipt of the ambient light signal. In some embodiments, a vacuum is included in the flexible laser shroud to remove laser debris and gases associated with laser operations and provide a suction to maintain flexible laser light seal in contact with the work surface of the composite layup tool.

In various embodiments, the flexible laser shroud system described herein may be advantageously used to provide local laser protective shielding for laser cutting and laser ablation operations. For example, in various embodiments disclosed herein, specialized laser screening rooms are not required to perform laser operations. Additionally, bulky target items do not need to be transported to the specialized laser screening room. Utilizing a flexible and portable laser shroud system provides an effective and safe laser protective shield for laser operations.

FIG. 1 illustrates a flexible laser shroud system 100 secured to a robotic arm 103 in accordance with an embodiment of the disclosure. System 100 may be used for a flexible and adaptable laser safety shroud in accordance with various techniques described herein. System 100 may be used on a variety of platforms, such as on an automated robot 101 of FIG. 1 or a gantry system, for example, that requires laser safety protection. System 100 may be used in a variety of laser applications, such as precise laser cutting, cleaning by laser ablation, or other types of laser applications.

In one embodiment, system 100 includes a flexible laser shroud 110, a robotic arm control 120, and a laser failsafe electronics 130. In the embodiment shown in FIG. 1, system 100 may be used with robot 101 to perform laser ablation of tool 111 at rest on table 106. Robot 101 includes a robotic arm 103 that is secured to a laser end effector 105. In some embodiments, shroud 110 is attached to robotic arm 103 to cover laser end effector 105 and extends to work surface 107 of tool 111. In various embodiments, an external laser source of laser light energy is provided to laser end effector 105 via a fiber optic cable, for example, that extends from the external laser source, through robotic arm 103, to laser end effector 105.

In some embodiments, shroud 110 conforms to work surface 107. Robotic arm 103 may operate laser end effector 105 by moving laser end effector 105 along work surface 107 to laser clean tool 111. Shroud 110, attached to robotic arm 103 and extending over laser end effector 105 to work surface 107, moves with laser end effector 105 along work surface 107 to provide a flexible laser light seal (e.g., such as provided by flexible laser light seal 312 of FIG. 3A) to substantially prevent laser light energy from emitting past shroud 110. In this regard, laser light energy is prevented from passing through shroud 110. Furthermore, laser light energy is prevented from passing between shroud 110 and work surface 107. In some embodiments, system 100 maintains the laser light seal over contoured surfaces 112 and flat surfaces 114 of tool 111. In some embodiments, system 100 maintains the laser light seal along edges 113 of tool 111.

In some embodiments, the shape of shroud 110 is configured to optimize the proximity of shroud 110 seal to laser end effector 105 to maintain the laser light seal over tool 111 contours 112 and edges 113. A laser safety protective seal (e.g., by way of flexible laser light seal 312) may be maintained along work surface 107 of tool 111 by minimizing the distance from the laser projection area to shroud 110. Minimizing the distance from laser end effector 105 to an edge of shroud 110 enhances laser cleaning (e.g., or laser cutting) in close proximity to edge 113 of tool 111. In some embodiments, shroud 110 round shapes may be more effective on curved contours 112, while square shapes may be more effective along straight edges 113.

In some embodiments, robotic arm control 120 may control robotic arm 103 as laser end effector 105 moves along work surface 107. In this regard, robotic arm control 120 may be programmed to index work surface 107, contours 112 and edges 113 of tool 111. Robotic arm control 120 may control position of shroud 110 and laser end effector 105 (e.g., both coupled to robotic arm 103) on work surface 107 to maintain the laser light tight seal as laser end effector 105 moves along tool 111. Robotic arm control 120 may be programmed by an external laser controller 116 to control robotic arm 103 and to perform any of the various operations described herein. In one embodiment, robotic arm control 120 may be in communication with components of system 100 and/or external laser controller 116 through an antenna 115a. In various embodiments, robotic arm control 120 may be in communication with components of system 100 and/or external laser controller 116 through a hard-wired connection.

In some embodiments, failsafe electronics 130 includes an interlock to robotic arm control 120 to prevent laser end effector 105 from projecting laser light energy when ambient light is detected within shroud 110. In this regard, an ambient light sensor (e.g., such as ambient light sensor 235 of FIG. 2) transmits an electrical signal to failsafe electronics 130 when ambient light is detected within shroud 110. In some embodiments, failsafe electronics 130 transmits commands (e.g., in the form of electrical signals) to robotic arm control 120 to stop laser end effector 105 from lasing and/or robotic arm 103 from moving along work surface 107 in response to ambient light sensor. In various embodiments, failsafe electronics 130 communicates with components of system 100 through antenna 115b.

Figure 2:
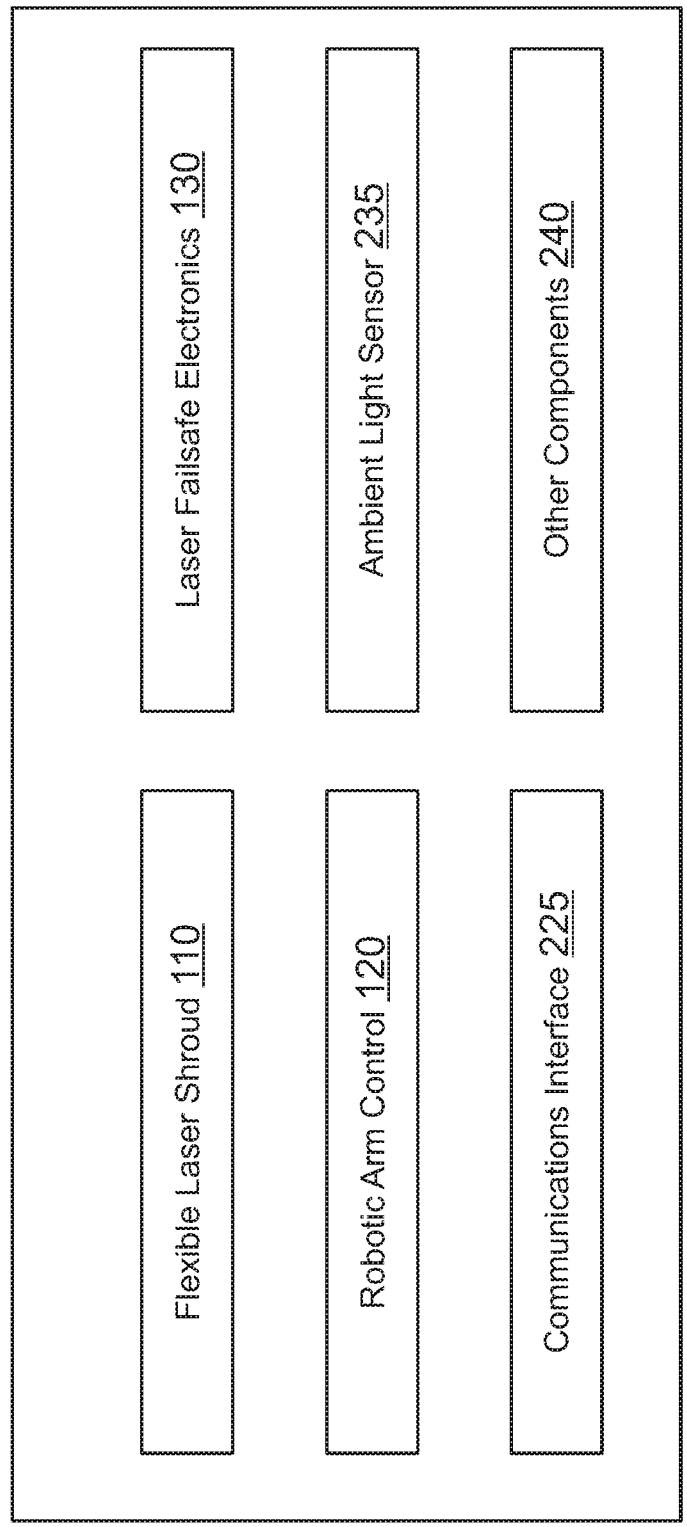
FIG. 2 illustrates a block diagram of a flexible laser shroud system in accordance with an embodiment of the disclosure.

FIG. 2 illustrates a block diagram of a system 100 in accordance with an embodiment of the disclosure. System 100 may be used as a flexible laser shroud system to safely operate a laser end effector and provide laser safety protection. In one embodiment, system 100 includes flexible laser shroud 110, robotic arm control 120, laser failsafe electronics 130, communications interface 225, and ambient light sensor 235. In one embodiment, various components of system 100 may be included on robot 101.

In various embodiments, flexible laser shroud 110 is implemented to seal laser light to substantially prevent laser light energy from passing through shroud 110 and between shroud 110 and work surface 107 as laser end effector 105 travels along work surface 107. In this regard, shroud 110 may be constructed of materials and/or implemented to allow it to conform to contours 112 of work surface 107. Furthermore, shroud 110 may be constructed in shapes (e.g., round, square, circular, and/or triangular, for example) optimized to maintain a laser light tight seal as laser end effector 105 moves along contoured 112 and/or flat 114 surfaces of tool 111.

In one embodiment, robotic arm control 120 is implemented as a processor, and may include, for example, a microcontroller, a field programmable gate array (FPGA), a digital signal processing (DSP) device, one or more memories for storing executable instructions (e.g., software, firmware, or other instructions), and/or any other appropriate combination of processing device and/or memory to execute instructions to perform any of the various operations described herein. In various embodiments, robotic arm control 120 is adapted to interface and/or communicate with components 116, 225, 130, and 235 to perform method and processing steps as described herein.

In some embodiments, robotic arm control 120 is adapted to process sensor signals and execute instructions to transmit control signals to robotic arm 103. For example, robotic arm control 120 may be adapted to receive edge 113 information of tool 111 from external controller 116 and/or perform operations to determine an edge 113 perimeter of tool 111 (e.g., by locating and storing edge 113 information of tool 111). Robotic arm control 120 may control robotic arm 103, with shroud 110 coupled to robotic arm 103, to confine laser light energy from laser end effector 105 to work surface 107 as robotic arm 103 moves along edges 113 of work surface 107. Furthermore, robotic arm control 120 may be adapted to stop shroud 110 from extending beyond edges 113 of work surface 107. In some embodiments, robotic arm control 120 is adapted to stop laser end effector 105 from lasing when shroud 110 separates from work surface 107.

Robotic arm control 120 may be adapted to receive electrical signals from laser failsafe electronics 130 and ambient light sensor 235, and store failsafe electronics 130 and ambient light sensor 235 signals. In some embodiments, robotic arm control 120 is adapted to process failsafe electronics 130 signals and transmit laser light emission data to external laser controller 116. In some embodiments, robotic arm control 120 is adapted to stop laser end effector 105 from projecting laser light energy in response to failsafe electronics 130 electrical signals. In some embodiments, robotic arm control 120 may be programmed to maintain laser end effector 105 substantially perpendicular to work surface 107 during lasing operations to reduce scattered laser light energy within shroud 110.

In various embodiments, communications interface 225 may include one or more wired or wireless communication components, such as an Ethernet connection, a wireless local area network (WLAN) component based on the IEEE 802.11 standards, a wireless broadband component, or various other types of wireless communication components including radio frequency (RF), microwave frequency (MWF), and/or infrared frequency (IRF) components adapted for communication with robotic arm control 120, laser failsafe electronics 130, and ambient light sensor 235. In some embodiments, communications interface 225 may provide a hard-wired connection from robotic arm control 120, laser failsafe electronics 130, and/or ambient light sensor 235 to laser controller 116. In other embodiments, communications interface 225 may be coupled to antennas 115a-c for wireless communication to various components of system 100, and external laser controller 116.

In some embodiments, laser failsafe electronics 130 is implemented as an interlock to stop and/or prevent laser end effector 105 from lasing when ambient light is detected within shroud 110. In some embodiments, laser failsafe electronics 130 may be implemented as a processor, and may include, for example, a microcontroller, a field programmable gate array (FPGA), and one or more memories for storing executable instructions (e.g., software, firmware, or other instructions), and/or any other appropriate combination of processing device and/or memory. In some embodiments, laser failsafe electronics 130 includes one or more switches coupled between the external laser source and laser end effector 105 to prevent laser end effector 105 from projecting laser light energy. Processor of laser failsafe electronics 130 may control switches to prevent laser light energy from laser end effector 105 when ambient light is detected within shroud 110. In some embodiments, failsafe electronics 130 communicates with robotic arm control 120 (e.g., by way of antenna 115b) to stop laser end effector 105 from lasing and/or robotic arm 103 from moving along work surface 107 in response to ambient light detected within shroud 110.

Ambient light sensor 235 may be integrated within shroud 110 to detect an ambient light entering shroud 110. In some embodiments, ambient light sensor 235 is implemented as a photodiode, a photoconductor, and/or a phototransistor. In various embodiments, ambient light sensor 235 may be implemented as an integrated circuit including one or more photodiodes, photoconductors, and/or phototransistors. In some embodiments, ambient light sensor 235 is adapted to transmit an electrical signal to laser failsafe electronics 130 when ambient light is detected within shroud 110.

In various embodiments, other components 240 may be implemented with system 100. For example, system 100 may include a vacuum device 240 coupled to robotic arm 103. In some embodiments, vacuum device 240 may be implemented as any vacuum controlled removal device adapted to exhaust ablation particles and gases produced during laser operations. Vacuum device 240 may be implemented as one or more vacuum ports 242 formed within shroud 110 to provide suction within shroud 110 to remove laser ablation debris. In some embodiments, suction from vacuum device 240 assists to maintain shroud 110 in conformance with work surface 107.

Figure 3A:
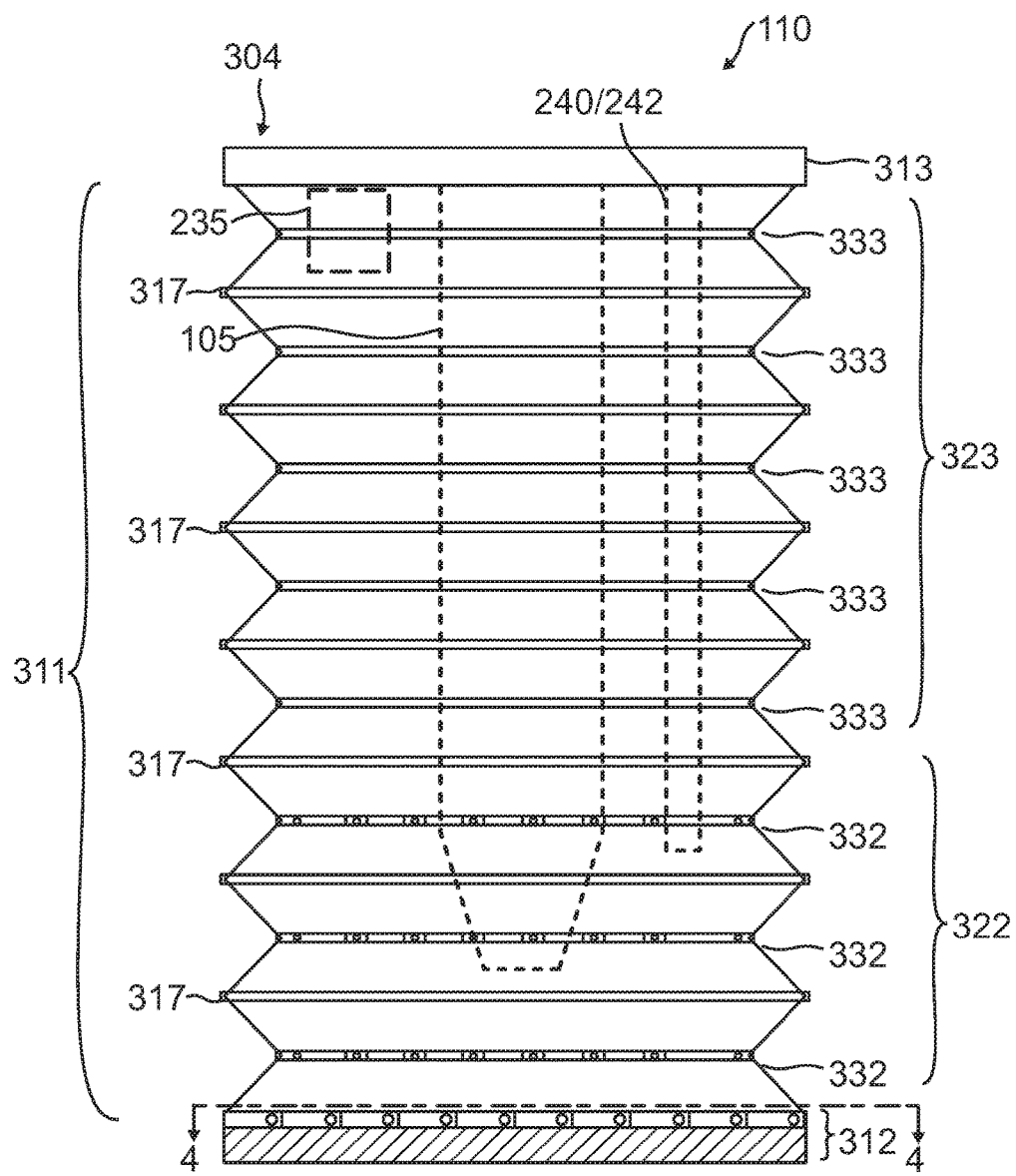
FIG. 3A illustrates an elevation view of a flexible laser shroud in accordance with an embodiment of the disclosure.

FIG. 3A illustrates an elevation view of a flexible laser shroud 110 in accordance with an embodiment of the disclosure. In some embodiments, shroud 110 includes bellows 311, a flexible laser light seal 312, and a light tight seal 313. Shroud 110 is adapted to couple to an end of robotic arm 103 at light tight seal 313. Light tight seal 313 is adapted to prevent laser light energy emissions at shroud 110 interface to robotic arm 103.

In some embodiments, bellows 311 may be implemented from elastomeric materials capable of absorbing laser light energy, such as laser curtains, for example. In this regard, bellows 311 material may absorb scattered laser light energy reflected off work surface 107 and/or discharged directly from laser end effector 105. In some embodiments, bellows 311 may be implemented as an articulated bellows including bellow folds 317, flexible support rings 332, and rigid support rings 333.

In various embodiments, a first portion 322 of bellows 311 includes folds 317 coupled between flexible support rings 332. Flexible support rings 332 are arranged at folds 317 within first portion 322 of bellows 311 near an end of shroud 110 extending to work surface 107 where flexible laser light seal 312 is attached (e.g., a lower portion of shroud 110).

Significantly, folds 317 coupled between flexible support rings 332 at first portion 322 allow shroud 110 to flexibly conform to contoured surfaces 112 of tool 111.

In various embodiments, a second portion 323 of bellows 311 includes folds 317 coupled between rigid support rings 333. Rigid support rings 333 are arranged at folds 317 within second portion of bellows 311 near an end where shroud 110 is attached to an end of robotic arm 103, at light tight seal 313. Rigid support rings 333 provide deflection stiffness to shroud 110 at the end attached to robotic arm 103 (e.g., at an upper portion of shroud 110). Significantly, shroud 110 maintains shape as robotic arm 103 moves laser end effector 105 and shroud 110 along work surface 107.

In various embodiments, ambient light sensor 235 is integrated within shroud 110 at a top surface 304 of shroud 110. In various embodiments, vacuum device 240 and/or vacuum ports 242 are integrated within shroud 110 at top surface 304. Vacuum ports 242 extend through shroud 110 along laser end effector 105 to remove debris and gases from shroud 110 during laser operations, as discussed herein.

Figure 3B:
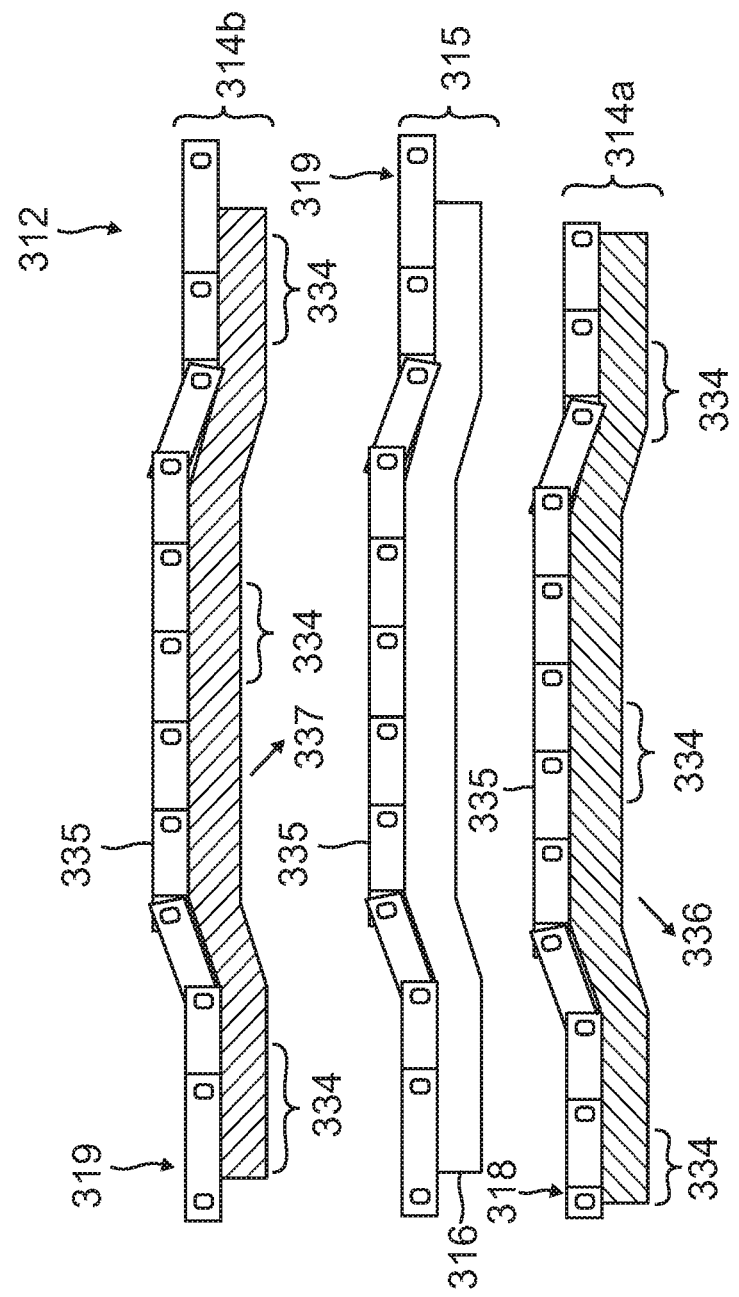
FIG. 3B illustrates an elevation view of a flexible laser light seal in accordance with an embodiment of the disclosure.

FIG. 3B illustrates an elevation view of a flexible laser light seal 312 in accordance with an embodiment of the disclosure. Flexible laser light seal 312 is adapted to conform to work surface 107 (e.g., including contoured 112 and/or flat 114 surfaces of tool 111) to substantially prevent laser light energy from passing through shroud 110 and between shroud 110 and work surface 107 as laser end effector 105 travels along work surface 107. In various embodiments, flexible laser light seal 312 is coupled to shroud 110 at an end extending to work surface 107. In some embodiments, flexible laser light seal 312 includes segmented angled brushes 334 flexibly attached to bending ring chain supports 335. Bending ring chain supports 335 may be implemented from metallic, plastic and/or nylon material interlocked to form a flexible chain link structure. Furthermore, bending ring chain supports 335 are attached to first portion 322 of bellows 311. In this regard, by adapting flexible laser light seal 312 to include segmented angled brushes 334 flexibly attached to bending ring supports 335, and attaching bending ring supports to shroud 110 at a first portion of bellows 311, a flexible laser shroud 110 is robustly implemented as part of system 100.

In various embodiments, flexible laser light seal 312 is implemented as a first row 314a of segmented angled brushes 334, and a second row 314b of segmented angled brushes 334. In some embodiments, first row 314a includes segmented angled brushes 334 angled in a first direction 336, for example. First row 314a may be coupled to an outer edge 318 of shroud 110 and adapted to be flexibly attached to an outer perimeter of shroud 110 at bending ring chain supports 335.

In some embodiments, second row 314b includes segmented angled brushes 334 angled in a second direction 337, approximately perpendicular to first direction 336. In other embodiments, second row 314b may include segmented angled brushes 334 angled less than or more than substantially perpendicular to first direction 336. Second row 314b may be coupled to an inner edge 319 of shroud 110 and adapted to be flexibly attached to an inner perimeter of shroud 110 at bending ring supports 335. In this regard, by repeating rows a-b of segmented angled brushes 334 adapted to be angled substantially perpendicular with respect to each other, a robust flexible laser light seal 312 is implemented to confine laser light energy within shroud 110. It is understood other laser absorbing flexible materials may be used to implement flexible laser light seal 312 in other embodiments.

In some embodiments, opaque seal 315 may be implemented for additional laser light energy seal at flexible laser light seal 312. In some embodiments, opaque seal 315 includes an opaque material 316. Opaque material 316 may be implemented from a woven material or fabric similar to that used for laser curtains, capable of absorbing laser light energy. In some embodiments, opaque material 316 may be able to conform to the shape of contoured 112 and/or flat 114 surfaces of tool 111.

In various embodiments, opaque seal 315 includes opaque material 316 flexibly attached to bending ring chain supports 335. In some embodiments, opaque seal 315 may be disposed between first row 314a and second row 314b of segmented angled brushes 334 to prevent laser light energy from passing through shroud 110. Opaque seal 315 may be coupled to an inner edge 319 of shroud 110 and adapted to be flexibly attached to an inner perimeter of shroud 110 at bending chain ring supports 335.

Figure 4:
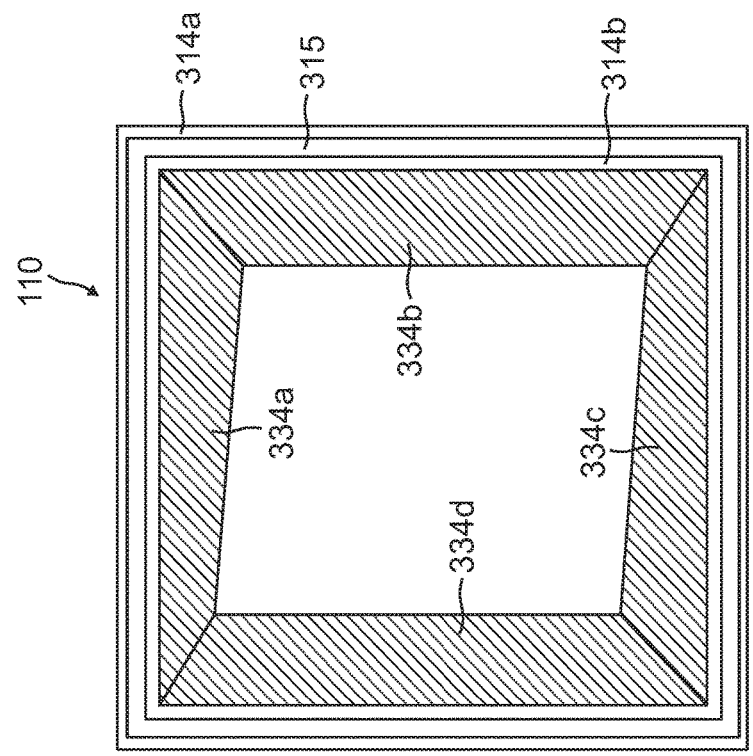
FIG. 4 illustrates a cross section view taken at line 4-4 of the shroud of FIG. 3A in accordance with an embodiment of the disclosure.

FIG. 4 illustrates a cross section view taken at line 4-4 of shroud 110 of FIG. 3A in accordance with an embodiment of the disclosure. As illustrated in FIG. 4, shroud 110 includes flexible laser light seal 312 first row 314a, opaque seal 315, and second row 314b. The illustrated embodiment shows shroud 110 is implemented as a square shroud 110. However, other shapes are possible, such as rectangular, round, and/or triangular, for example. In some embodiments, second row 314b is implemented with segmented angled brushes 334a-d that are canted at an angle such that orifice at end of shroud 110 conforming to work surface 107 is smaller than end of shroud 110 coupled to robotic arm 103. In this regard, canting segmented angled brushes 334a-d of flexible laser light seal 312 toward work surface 107 maintains a laser light energy seal at edges 113 of tool 111.

Figure 5:
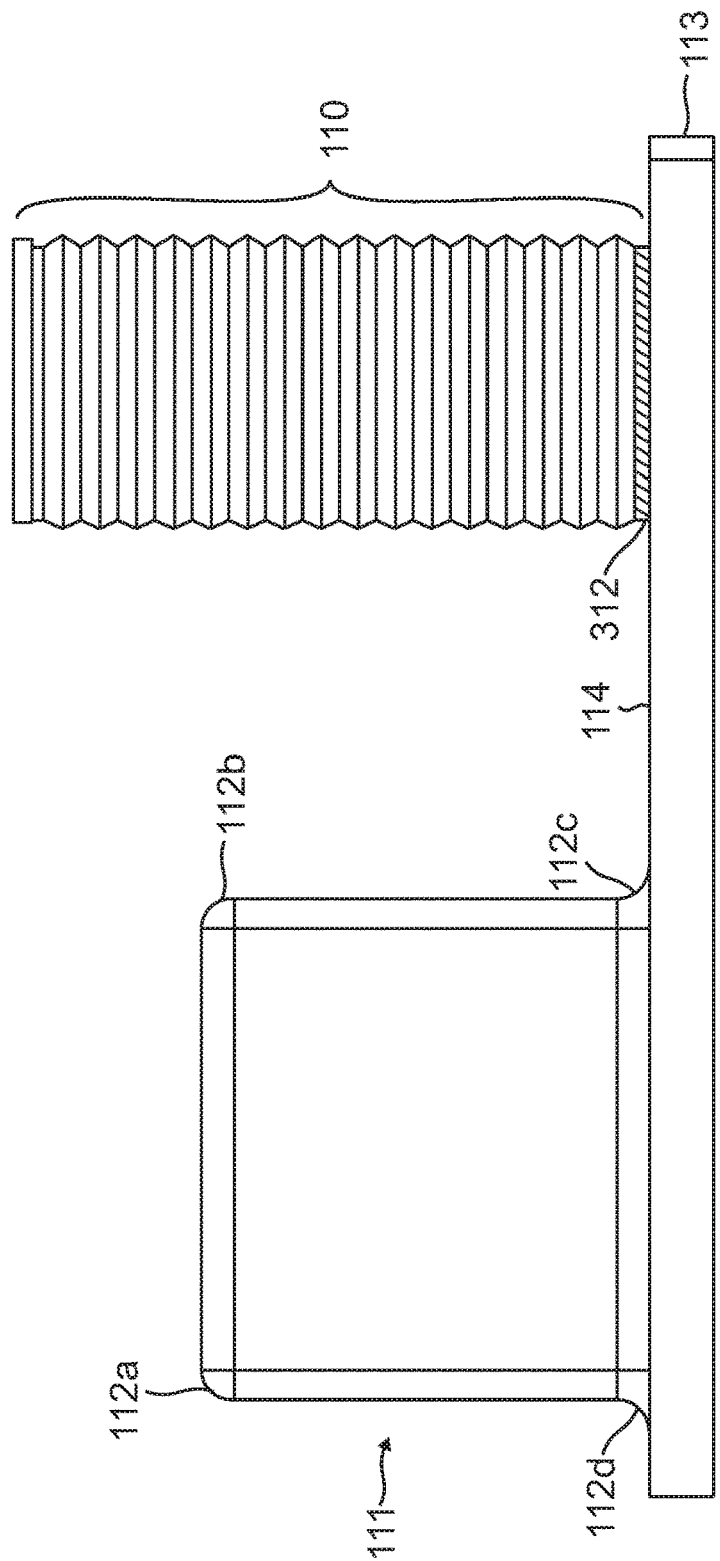
FIG. 5 illustrates a flexible laser shroud on a flat surface in accordance with an embodiment of the disclosure.
Figure 6A:
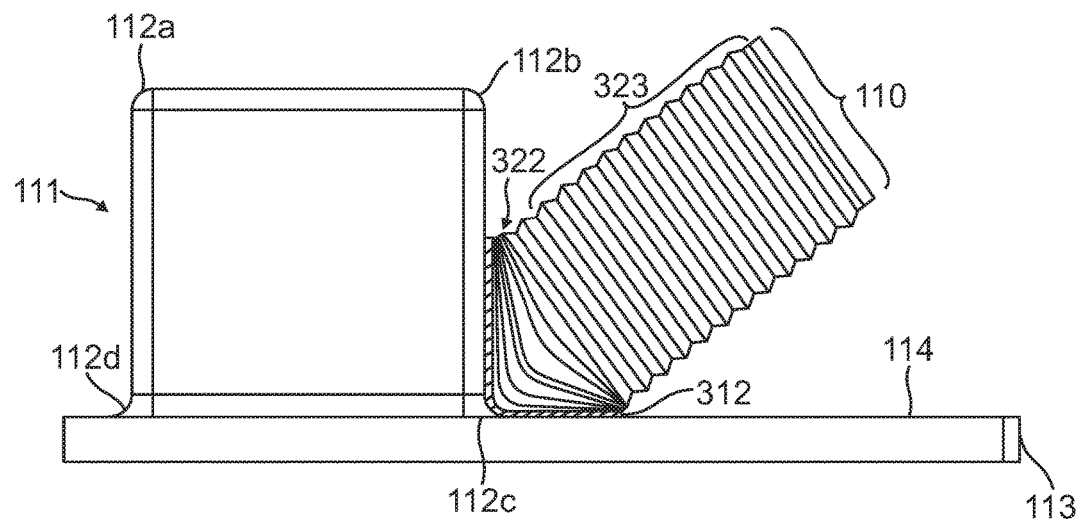
Figure 6B:
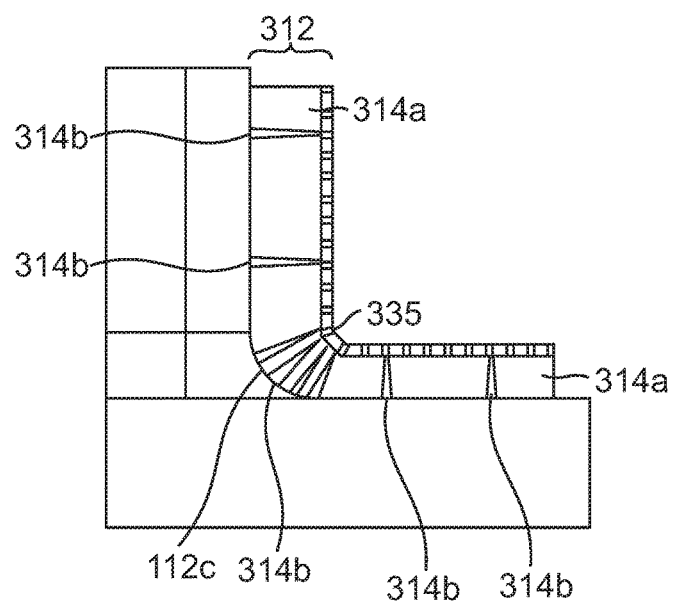
Figure 7:
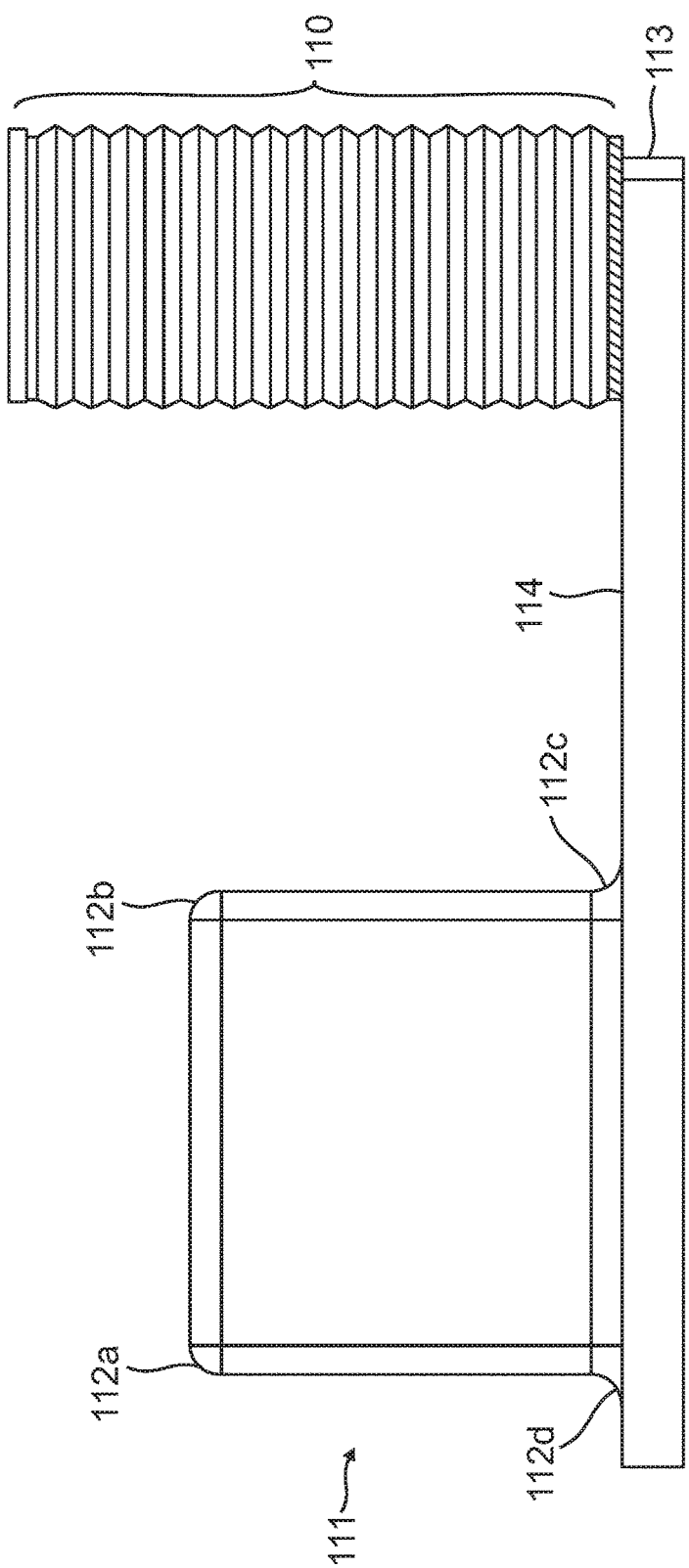
FIG. 7 illustrates a flexible laser shroud at a surface edge in accordance with an embodiment of the disclosure.

FIGS. 5 through 7 illustrate various views of flexible laser shroud 110 in accordance with embodiments of the disclosure. These views aid in illustrating embodiments of the disclosure and the detailed discussion herein may refer to these views and elements contained within these views.

As illustrated in FIGS. 5 through 7, tool 111 may include contoured surfaces 112a-d, flat surfaces 114, and edges 113. FIG. 5 through FIG. 7 illustrate how flexible laser shroud 110 may adapt to various surfaces of tool ill to provide a laser light energy seal as robotic arm 103 travels along tool 111. FIG. 5 illustrates a flexible laser shroud 110 on a flat surface 114 of tool 111 in accordance with an embodiment of the disclosure. Referring now to FIG. 5, in some embodiments, shroud 110 may be implemented as a square shaped shroud 110 to effectively seal laser light energy on flat surface 114. In this regard, flexible laser light seal 312 effectively conforms to flat surface 114 to substantially prevent laser light energy from passing through shroud 110 and between shroud 110 and work surface 107.

FIGS. 6A-C illustrate a flexible laser shroud 110 on a contoured work surface 107 in accordance with embodiments of the disclosure. Referring now to FIG. 6A, in some embodiments, shroud 110 may be implemented as a round shroud 110 to effectively conform to contoured surface 112c shape. As shown in FIG. 6A, flexible laser light seal 312 flexibly conforms to contoured surface 112c. Furthermore, first portion 322 of shroud 110 flexibly bends to allow shroud 110 to conform to contoured surface 112c. In addition, second portion 323 of shroud 110 maintains deflection stiffness at the end of shroud 110 that couples to robotic arm 103, as discussed herein.

FIG. 6B illustrates flexible laser light seal 312 conforming to surface 112c. Referring now to FIG. 6B, flexible laser light seal 312 includes a first row 314a, and a second row 314b, as discussed herein. In the embodiment shown, first row 314a effectively prevents laser light energy from passing through shroud 110 and between shroud 110 and work surface 107. As shown, bending ring chain supports 335 of first row 314a bend at joints to conform to contoured surface 112c. However, gaps may be formed in first row 314a at contoured surface 112c. In this regard, second row 314b may additionally block laser light energy. Furthermore, opaque seal 315 may be implemented for additional laser light energy seal at flexible laser light seal 312, as discussed herein.

FIG. 6C illustrates a flexible laser shroud 110 on a contoured surface in accordance with an embodiment of the disclosure. As shown in FIG. 6C, shroud 110 may be implemented as a round shaped shroud 110 to effectively seal laser light energy on contoured surface 112b. Flexible laser light seal 312 effectively conforms to contoured surface 112b to substantially prevent laser light energy from passing through shroud 110. As shown, first portion 322 of shroud 110 flexibly bends to allow shroud 110 to conform to contoured surface 112b at flexible laser light seal 312. Second portion 323 of shroud 110 maintains a deflection stiffness at end of shroud 110 that couples to robotic arm 103, as discussed herein.

FIG. 7 illustrates a flexible laser shroud 110 at a surface edge 113 in accordance with an embodiment of the disclosure. As shown in FIG. 7, shroud 110 may come in close proximity to edge 113 along flat surface 114 of tool 111. In some embodiments, shroud 110 includes an inner row 314b of flexible laser light seal 312 implemented with segmented angled brushes 334a-d canted to form an inward angled orifice at end of shroud 110 extending to surface 114, as discussed herein. By providing segmented angled brushes 334a-d canted inward, shroud 110 may closely approach edge 113 to perform laser operations and maintain a laser light energy seal.

Figure 8:
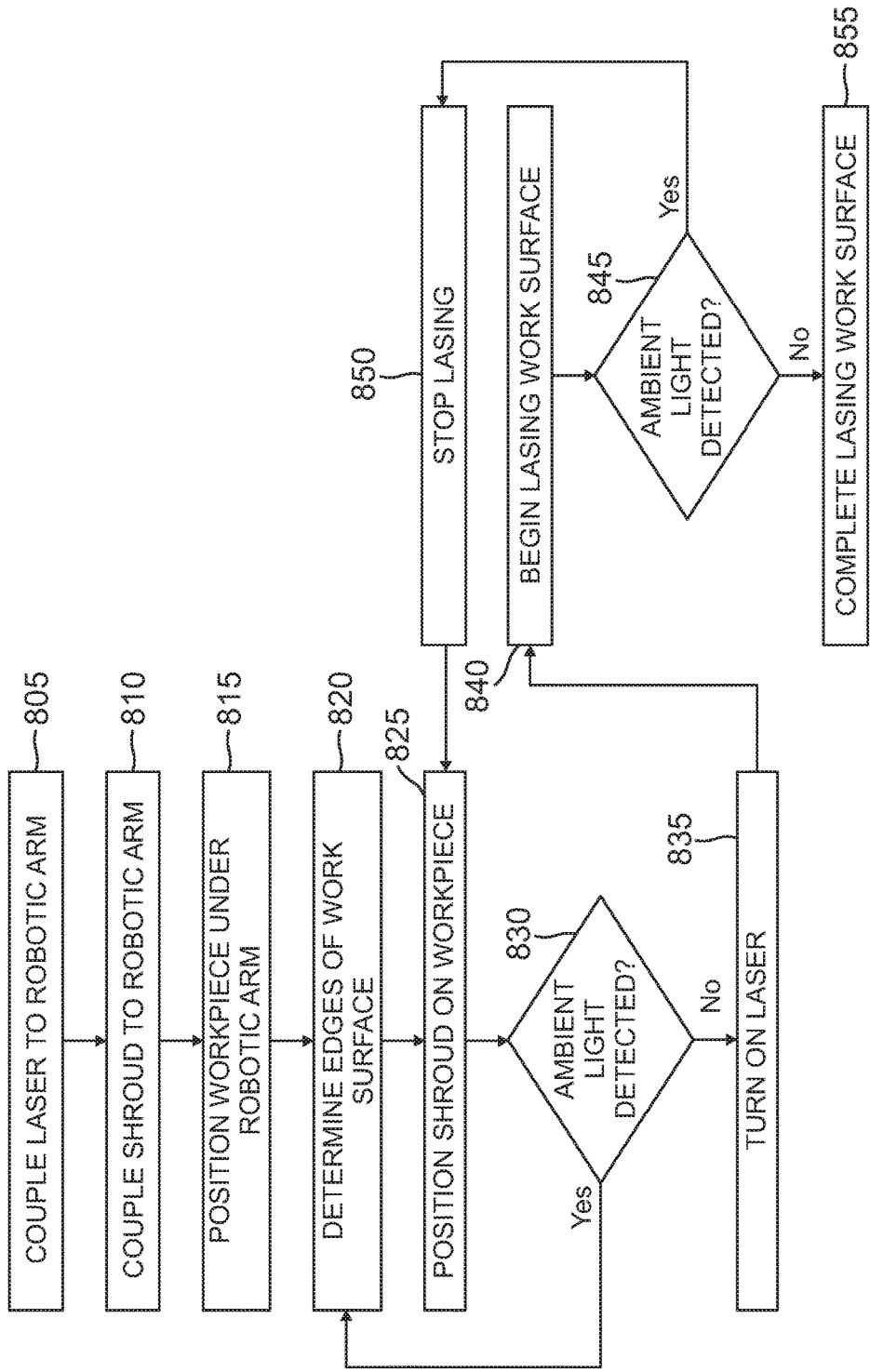
FIG. 8 illustrates a process of using a flexible laser shroud in accordance with an embodiment of the disclosure.

FIG. 8 illustrates a process of using a flexible laser shroud 110 in accordance with an embodiment of the disclosure.

In block 805, laser end effector 105 may be coupled to robotic arm 103 to perform laser operations. In some embodiments, laser operations may include laser cutting. In various embodiments, laser operations may include laser ablation of tool 111.

In block 810, shroud 110 may be attached to robotic arm 103 and extend over laser end effector 105. In some embodiments, a round shroud 110 may be attached to robotic arm 103. In other embodiments, a square or a circular shroud 110 may be attached to robotic arm 103 depending on a contour of tool 111, as discussed herein.

In block 815, a workpiece such as tool 111 may be positioned on table 106 under robotic arm 103.

In block 820, edges 113 of tool 111 may be determined. In some embodiments, robotic arm control 120 may be adapted to receive edges 113 information from external laser controller 116 and store edges 113 information in memory.

In block 825, shroud 110 may be positioned on tool 111. In some embodiments, shroud 110 may be positioned at an optimal starting location on tool 111, such as a flat surface 114. In some, embodiments, shroud 110 may be positioned on tool 111 at a location where robotic arm 103 has recently stopped lasing.

In block 830, system 100 may determine (e.g., by way of robotic arm control 120) if ambient light is present within shroud 110 prior to turning on laser end effector 105 by communicating with ambient light sensor 235 and/or laser failsafe electronics 130. In this regard, ambient light sensor 235 may transmit an electrical signal to laser failsafe electronics 130 when ambient light is detected within shroud 110. In some embodiments, laser failsafe electronics 130 includes an interlock to prevent laser end effector 105 from projecting when ambient light is detected within shroud 110.

If ambient light is detected within shroud 110, the process may return to block 820 where edges 113 of work surface 107 may be re-programmed into robotic arm control 120 and stored in memory, as discussed herein. Furthermore, shroud 110 may be re-positioned on tool 111, and system 100 may again determine if ambient light is present within shroud 110.

If ambient light is not detected, the process may proceed to block 835 where controller 116 may turn on laser end effector 105. In this regard, controller 116 may communicate to robot 101 to power on laser end effector 105. In some embodiments, external laser controller 116 may be in communication with laser failsafe electronics 130 to operate one or more switches that power laser end effector 105.

In block 840, system 100 begins lasing work surface 107 of tool 111. Robotic arm control 120 may be programmed by external laser controller 116 to control robotic arm 103 during laser operations. In this regard, robotic arm control 120 may move laser end effector 105 along work surface 107 of tool 111 to perform laser operations based on pre-programmed instructions transmitted by external laser controller 116. In other embodiments, controller 116 may communicate with robotic arm control in near real time and transmit instructions for moving laser end effector 105 along work surface 107. Laser light energy projected from laser end effector 105 to work surface 107 may be confined within shroud 110.

In block 845, system 100 may monitor (e.g., by way of robotic arm control 120) if ambient light is present within shroud 110 by communicating with ambient light sensor 235 and/or laser failsafe electronics 130, as discussed herein. If ambient light is detected, the process may proceed to block 850.

In block 850, ambient light sensor 235 is adapted to transmit an electrical signal to laser failsafe electronics 130 when ambient light is detected within shroud 110. Laser failsafe electronics 130 includes an interlock to stop projecting laser light energy at laser end effector 105 when an electric signal is received from ambient light sensor 235, as discussed herein. In some embodiments, failsafe electronics 130 communicates with robotic arm control 120 to stop robotic arm 103 from moving along work surface 107 in response to ambient light detected within shroud 110.

If ambient light is detected, the process may proceed to block 825 where shroud 110 may be re-positioned on tool 111. Thereafter, the process may proceed to block 830 where system 100 may again determine if ambient light is present within shroud 110. If ambient light sensor 235 again detects ambient light, the process may proceed to block 820 to re-define edges 113 of work surface 107 of tool 111, and re-position shroud 110 on tool 111. The process may proceed to block 830 where system 100 may again determine if ambient light is present within shroud 110.

If ambient light is not detected within shroud 110 at block 845, the process may proceed to block 855 where lasing of tool 111 is completed and robotic arm control 120 may communicate with external laser controller 116 to stop laser end effector 150 from projecting laser light energy.

In view of the present disclosure, it will be appreciated that providing system 100, in accordance with various embodiments set forth herein, may provide for a portable and flexible laser shroud system to protect from harmful effects of stray laser light energy during laser operations. In this regard, by providing a flexible laser shroud including bellow folds coupled to bendable support rings for bendable support to flexible laser light seals, bellow folds coupled to rigid support rings for rigid support at a robotic arm attach, rows of opposing segmented brushes conforming to contoured work surfaces to prevent laser light energy from passing through the shroud, an additional row of opaque material disposed between rows of segmented brushes, canting an inner row of brushes inward at the work surface, ambient light sensor to detect ambient light within the shroud, failsafe electronics including laser power interlock to stop lasing when ambient light is detected, and programming an edge of tool surface to maintain the laser end effector on the tool work surface, a flexible and local laser shroud may be implemented for laser ablation and laser cutting operations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
    a laser end effector coupled to a robotic arm and configured to provide laser light energy to a work surface; and
    a shroud coupled to an end of the robotic arm and extending to the work surface, wherein the shroud comprises a flexible laser light seal configured to conform to the work surface to substantially prevent the laser light energy from passing between the shroud and the work surface as the laser end effector travels along the work surface.

2. The system of claim 1, wherein the shroud further comprises bellows having a plurality of folds coupled between a plurality of flexible support rings on a first portion of the bellows to provide a bendable support to the shroud at the flexible laser light seal.

3. The system of claim 2, wherein the plurality of folds are a first plurality of the folds, and wherein the bellows further comprise a second plurality of the folds coupled between a plurality of rigid support rings on a second portion of the bellows to provide a deflection stiffness to the shroud at the end coupled to the robotic arm.

4. The system of claim 1, wherein the flexible laser light seal comprises:
    a first row of segmented angled brushes angled in a first direction, coupled to an outer edge of the shroud, and configured to be flexibly attached to an outer perimeter of the shroud; and
    a second row of segmented angled brushes angled in an opposite direction to the first row, coupled to an inner edge of the shroud, positioned adjacent to the first row of segmented angled brushes, and configured to be flexibly attached to an inner perimeter of the shroud.

5. The system of claim 4, further comprising an opaque material disposed between the first and second rows of segmented angled brushes to prevent the laser light energy from passing through the shroud.

6. The system of claim 4, wherein the second row of segmented angled brushes are angled inward to provide a smaller orifice at the end conforming to the work surface.

7. The system of claim 1, further comprising an ambient light sensor coupled within the shroud and configured to detect ambient light when the shroud extends beyond an edge of the work surface and/or allows ambient light to enter the shroud.

8. The system of claim 7, further comprising a failsafe device coupled to the ambient light sensor and configured to stop the laser end effector from providing laser light energy when the ambient light is detected within the shroud.

9. The system of claim 1, further comprising a vacuum device coupled to the robotic arm and configured to form a suction within the shroud to remove debris and/or maintain the shroud in conformance with the work surface.

10. The system of claim 1, further comprising a shroud shape, wherein the shroud shape is configured as a rectangle, a square, a circle, and/or a triangle.

11. The system of claim 1, wherein the laser end effector is maintained substantially perpendicular to the work surface.

12. A method of assembling the system of claim 1, the method comprising:
    coupling the shroud to the end of the robotic arm, wherein the coupling comprises a light tight seal to prevent laser light energy emission around the seal; and
    adjusting the flexible laser light seal at the end of the shroud to conform to the work surface to substantially prevent the laser light energy from passing between the shroud and the work surface as the laser end effector travels along the work surface.

13. A method comprising:
    turning on a laser end effector coupled to a robotic arm;
    lasing a work surface by the laser end effector;
    moving the laser end effector along the work surface by the robotic arm; and
    confining laser light energy from the laser end effector to the work surface with a shroud coupled to the robotic arm.

14. The method of claim 13, wherein the moving of the laser end effector comprises programming the robotic arm to determine an edge of the work surface to stop the shroud from extending beyond the edge of the work surface.

15. The method of claim 13, further comprising detecting ambient light when the shroud extends beyond an edge of the work surface and/or when ambient light enters the shroud.

16. The method of claim 15, wherein the detecting comprises stopping the laser end effector from lasing and/or moving the laser end effector when the ambient light is detected within the shroud.

17. The method of claim 13, wherein the confining comprises selecting a shroud shape configured as a rectangle, a square, a circle, and/or a triangle as determined by a contour of the work surface.

18. The method of claim 13, wherein the shroud comprises a flexible laser light seal comprising:
 a first row of segmented angled brushes angled in a first direction, coupled to an outer edge of the shroud, and configured to be flexibly attached to an outer perimeter of the shroud; and
 a second row of segmented angled brushes angled in an opposite direction to the first row, coupled to an inner edge of the shroud, positioned adjacent to the first row of segmented angled brushes, and configured to be flexibly attached to an inner perimeter of the shroud;
 wherein the flexible laser light seal conforms to the work surface at an end of the shroud to substantially prevent laser light energy from passing between the shroud and the work surface, as the laser end effector travels along the work surface.

19. The method of claim 18, wherein the shroud comprises an opaque material disposed between the first and second rows of segmented angled brushes to prevent the laser light from passing through the shroud.

20. The method of claim 18, wherein the second row of segmented angled brushes are angled inward to provide a smaller orifice at the end of the shroud conforming to the work surface.

* * * * *